(12) United States Patent
Dubey et al.

(10) Patent No.: US 11,487,670 B2
(45) Date of Patent: Nov. 1, 2022

(54) MACHINE LEARNING BASED CACHE MANAGEMENT

(71) Applicant: VMWARE, INC., Palo Alto, CA (US)

(72) Inventors: Ankit Dubey, Ara (IN); Gurudutt Kumar Vyudayagiri Jagannath, Bangalore (IN); Siddhant Gupta, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 44 days.

(21) Appl. No.: 17/009,773

(22) Filed: Sep. 1, 2020

(65) Prior Publication Data
US 2022/0019541 A1    Jan. 20, 2022

(30) Foreign Application Priority Data

Jul. 16, 2020  (IN) .............................. 202041030423

(51) Int. Cl.
| | |
|---|---|
| *G06F 12/0875* | (2016.01) |
| *G06N 20/00* | (2019.01) |
| *G06F 13/16* | (2006.01) |
| *G06F 16/28* | (2019.01) |

(52) U.S. Cl.
CPC ...... *G06F 12/0875* (2013.01); *G06F 13/1668* (2013.01); *G06F 16/285* (2019.01); *G06N 20/00* (2019.01); *G06F 2212/604* (2013.01)

(58) Field of Classification Search
None
See application file for complete search history.

(56) References Cited

U.S. PATENT DOCUMENTS

| | | | |
|---|---|---|---|
| 9,639,546 B1* | 5/2017 | Gorski | G06F 12/121 |
| 2018/0247055 A1* | 8/2018 | Curtis | G06F 21/554 |
| 2019/0196853 A1* | 6/2019 | Koblents | G06F 9/45525 |
| 2019/0391919 A1* | 12/2019 | Gupta | G06F 12/0868 |

OTHER PUBLICATIONS

Infinidat's ~90% (average read hit) solution—#SFD16; Jul. 15, 2018; https://silvertonconsulting.com/blog/2018/07/15/Infinidats-90-average-read-hit-solution-sfd16/ <https://protect-us.mimecast.com/s/pGHUCL9 1I2IY1GkfB9vAX?domain=silvertonconsulting.com>.

* cited by examiner

*Primary Examiner* — Charles J Choi
(74) *Attorney, Agent, or Firm* — Patterson & Sheridan, LLP

(57) ABSTRACT

Techniques are disclosed for dynamically managing a cache. Certain techniques include clustering I/O requests into a plurality of clusters by a machine-learning clustering algorithm that collects the I/O requests into clusters of similar I/O requests based on properties of the I/O requests. Further, certain techniques include identifying, for a received I/O request, a cluster stored in the cache. Certain techniques further include loading a set of blocks of the identified cluster into the cache.

20 Claims, 10 Drawing Sheets

MACHINE LEARNING BASED CACHE MANAGEMENT

RELATED APPLICATIONS

Benefit is claimed under 35 U.S.C. 19(a)-(d) to Foreign Application Serial No. 202041030423 filed in India entitled "MACHINE LEARNING BASED CACHE MANAGEMENT", on Jul. 16, 2020, by VMware, Inc., which is herein incorporated in its entirety by reference for all purposes.

BACKGROUND

Virtual desktop infrastructure (VDI) is a desktop virtualization approach in which a desktop operating system (OS) runs and is managed in a data center and delivered over the network to a client device, such as a laptop computer or mobile device, so to the user it appears as if the desktop is running locally. The VDI helps in efficiently managing hardware and software resources and ultimately reduces cost.

One of the biggest problems VDI faces is the end-user performance issues. Some issues, such as poor performance due to boot storms, have been addressed with solutions such as a Content Based Read Cache (CBRC) in VDI deployments. However, CBRC works well in a VDI environment with static workloads as the CBRC is aimed at reducing the cost of I/O incurred in loading the same blocks from storage for use by multiple virtual computing instances (VCIs). A new solution is needed for workloads that are variable.

SUMMARY

A VDI system deals with a large number of client devices that are used to perform similar tasks and run similar kinds of applications, so they generate similar types of I/O workload. This similarity of I/O workload allows for block predictions, which ultimately increases VDI efficiency.

Certain embodiments herein provide a cache for a VDI system that adapts to a customer workload and works efficiently with very little or no specialized tuning. The embodiments use a machine-learning algorithm to cluster past I/Os into different clusters based on properties of the I/Os that are similar. Such properties include one or more of a time at which the corresponding I/O request was received, a size of the corresponding I/O request, a disk offset value of the corresponding I/O request, and a unique identifier of a workload that made the corresponding I/O request. Accordingly, when a new I/O comes in, one or more of the clusters is selected based on the similarity of the properties of new I/O to the properties of the existing clusters. Blocks associated with the selected cluster may then be stored in the cache. In particular, since the new I/O is related to the cluster, it is likely that blocks of the cluster are also likely going to be referenced, so populating the cache based on such a technique can provide for a high hit ratio.

Though certain aspects are described with respect to managing a cache for a VDI system, it should be understood that such aspects may equally be applied to any suitable computing system.

Certain embodiments include a method for dynamically managing content of a cache. The method includes receiving I/O requests from one or more virtual computing instances, wherein each I/O request specifies one or more blocks of data, clustering the I/O requests into a plurality of clusters by a machine-learning clustering algorithm that collects the I/O requests of the one or more virtual computing instances into clusters of similar I/O requests based on properties of the I/O requests, receiving a first I/O request from a first virtual computing instance, identifying, by the machine-learning clustering algorithm, a first cluster of the plurality of clusters as having similar I/O requests as the first I/O request based on properties of the first I/O request, and loading a set of blocks comprising at least one of the one or more blocks specified by at least one of the I/O requests of the first cluster into the cache.

Further embodiments include a computer-readable medium containing instructions that, when executed by a computing device, cause the computing device to carry out one more aspects of the above method, and a system comprising memory and a processor configured to carry out one or more aspects of the above method.

DETAILED DESCRIPTION

Figure 1A:
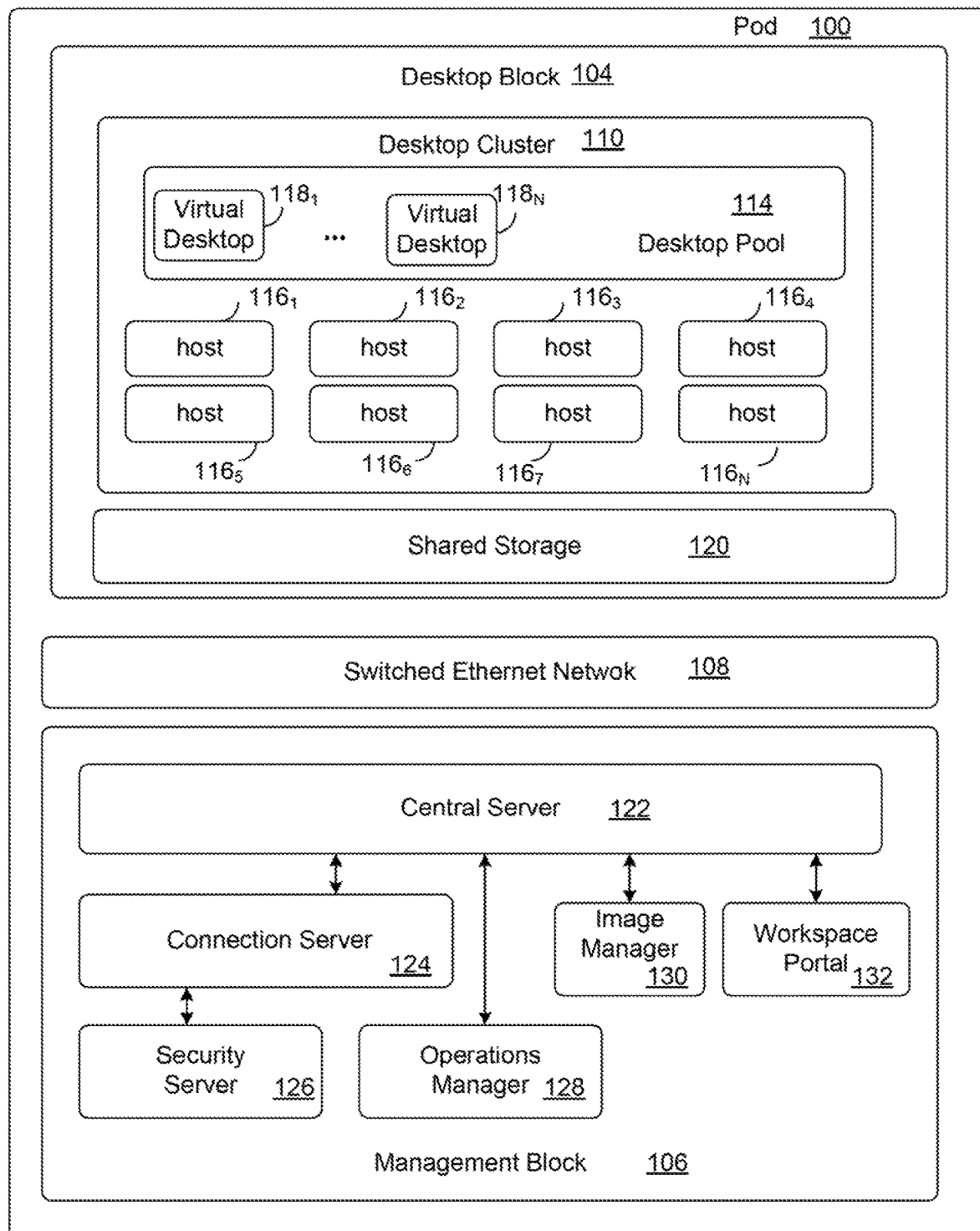
FIG. 1A depicts an infrastructure for supporting a plurality of virtual desktop clients, in an embodiment.

Certain embodiments described herein provide for dynamically adapting the contents of a cache to a workload, such as a workload of a virtual desktop application. For example, I/O requests (e.g., read, write, etc. such as to memory, storage, etc.) may be collected on a computing system. The I/O requests may be on a per-application level, per workload level, a per-host level, a per virtual computing instance (VCI) level, across applications, across multiple workloads, across multiple hosts, across multiple VCIs, etc. Each I/O request has one or more properties. The one or more properties can include one or more of (1) a time at which the corresponding I/O request was received, (2) a size of the corresponding I/O request, (3) a disk offset value of the corresponding I/O request, and (4) a unique identifier (unique id) of a workload (e.g., VCI) that made the corresponding I/O request. In certain aspects, the unique identifier may be a VM identifier, a process identifier, etc. In certain aspects, the unique identifier includes a set of a name of a VM and an application tag. A machine-learning clustering algorithm further processes the I/O requests into different clusters based on the properties of the I/O requests. Each cluster may specify one or more blocks (e.g., of memory, storage, etc.). Therefore, each of the clusters is associated with one or more blocks, also referred to herein as a set of blocks of the cluster.

Based on the similarity of the I/Os, it may be likely that if one I/O request is received and the I/O request is similar to a cluster, other data blocks of the cluster are also likely to be requested. Therefore, certain embodiments herein, when receiving an I/O request, determine whether the I/O request has properties similar to properties of one or more clusters. If so, the one or more clusters are loaded into a cache. Accordingly, if other similar I/O requests are later received, as is likely, then the I/O request is serviced from the cache instead of servicing the request from memory or storage, thereby improving speed and system performance.

In certain embodiments, the size of each of the clusters is defined by the size of the cache (e.g., available cache) and/or the cache hit ratio. For example, as discussed further herein, a reward-based learning algorithm may be used to dynamically define cluster size based on the cache hit ratio and available cache size to try and increase the cache hit ratio and thereby improve speed and system performance. In certain embodiments, if the hit ratio of the cache is determined to be less than a threshold, the sizes of the clusters are adjusted.

In certain embodiments, such as when a node (e.g., VCI) is initially booted for the first time, there is no past I/O record for the node, and therefore no learned clusters to use to load blocks into the cache prior to boot. Accordingly, in certain embodiments, the applications associated with the node (e.g., as identified by an administrator) may be used to determine one or more blocks to load into the cache to "pre-heat" the cache even prior to boot of the node. For example, one or more clusters may have previously been determined as associated with the one or more applications. Accordingly, one or more sets of blocks of the clusters may be loaded into the cache.

In certain embodiments, such as when a node is booted again after running previously, there is a past I/O record for the node. For example, there may have previously been one or more learned clusters associated with the node. The past I/O record may have been generated, for example, for a VCI running on the same machine to be rebooted or on another machine, such as due to a VCI migration. Accordingly, one or more sets of blocks of the clusters may be loaded into the cache.

In certain embodiments, the cache may not have sufficient space to load the selected clusters, and therefore one or more existing blocks in the cache may need to be evicted to make space in the cache for the clusters. In certain aspects, the least recently used (LRU) algorithm decides which blocks in the cache may be evicted. In certain aspects, the eviction algorithm takes into account the number of clusters containing a candidate block for eviction. For example, a block that is least recently used and included in a smaller number of clusters may be evicted from the cache in preference to a block that is included in a larger number of clusters. Cache size also a parameter which the eviction algorithm takes into account.

FIG. 1A depicts an infrastructure for supporting a plurality of virtual desktop clients, in an embodiment. As shown, pod 100 is a scalable and modular portion of the infrastructure that can support many thousands of virtual desktops, and virtual desktop clients, where a virtual desktop is an application running in the infrastructure and a virtual desktop client is an application in a client device that is usually remote from the infrastructure and coupled to one of the virtual desktops. Pod 100 includes a desktop block 104 and a management block 106, both of which are coupled to a switched Ethernet network 108 for communication.

Desktop block 104 includes a desktop cluster 110, which is a set of interoperating hosts $116_{1-N}$ and at least one desktop pool 114. Hosts $116_{1-N}$ are general-purpose computers having virtualization software for creating and managing a large number of virtual compute instances, such as virtual machines. For example, such hosts can be ESXi hosts from VMware®. Desktop pool 114 contains a large number of virtual compute instances $118_{1-N}$, each of which has been provisioned to run a virtual desktop application and is available to be assigned to a virtual desktop client when a user of the virtual desktop client selects one of the virtual desktops for use. In one embodiment, a virtual desktop application is a Windows 10 desktop.

Management block 106 includes a number of applications that manage desktop block 104. These applications include a central server 122, a connection server 124, a security server 126, an operations manager 128, a workspace portal 132, a virtual desktop image manager 130. Central server 122 manages the hosts $116_{1-N}$ and provisions virtual compute instances $118_{1-N}$ with the virtual desktop application. Security server 126 provides secure external access to virtual desktop applications. Operations manager 128 manages configurations and performance of the virtual compute instances $118_{1-N}$ running virtual desktop applications. Workspace portal 132 provides a store of applications for use in the virtual desktop application and the virtual desktop client. Virtual desktop image manager 130 manages images that are displayed on the virtual desktop clients. In one embodiment, central server 122 is a server running VMware vCenter software, connection server 124 is a VMware View Connection Server, security server 126 is a VMware View Security Server, operations manager 128 is a VMware vRealize Operations Manager, workspace portal 132 is a VMware Workspace Portal and virtual desktop image manager 130 is a VMware Mirage software application. In some embodiments, each of these applications runs in a virtual computing instance such as a virtual machine or other types of virtual computing instances such as a container.

Figure 1B:
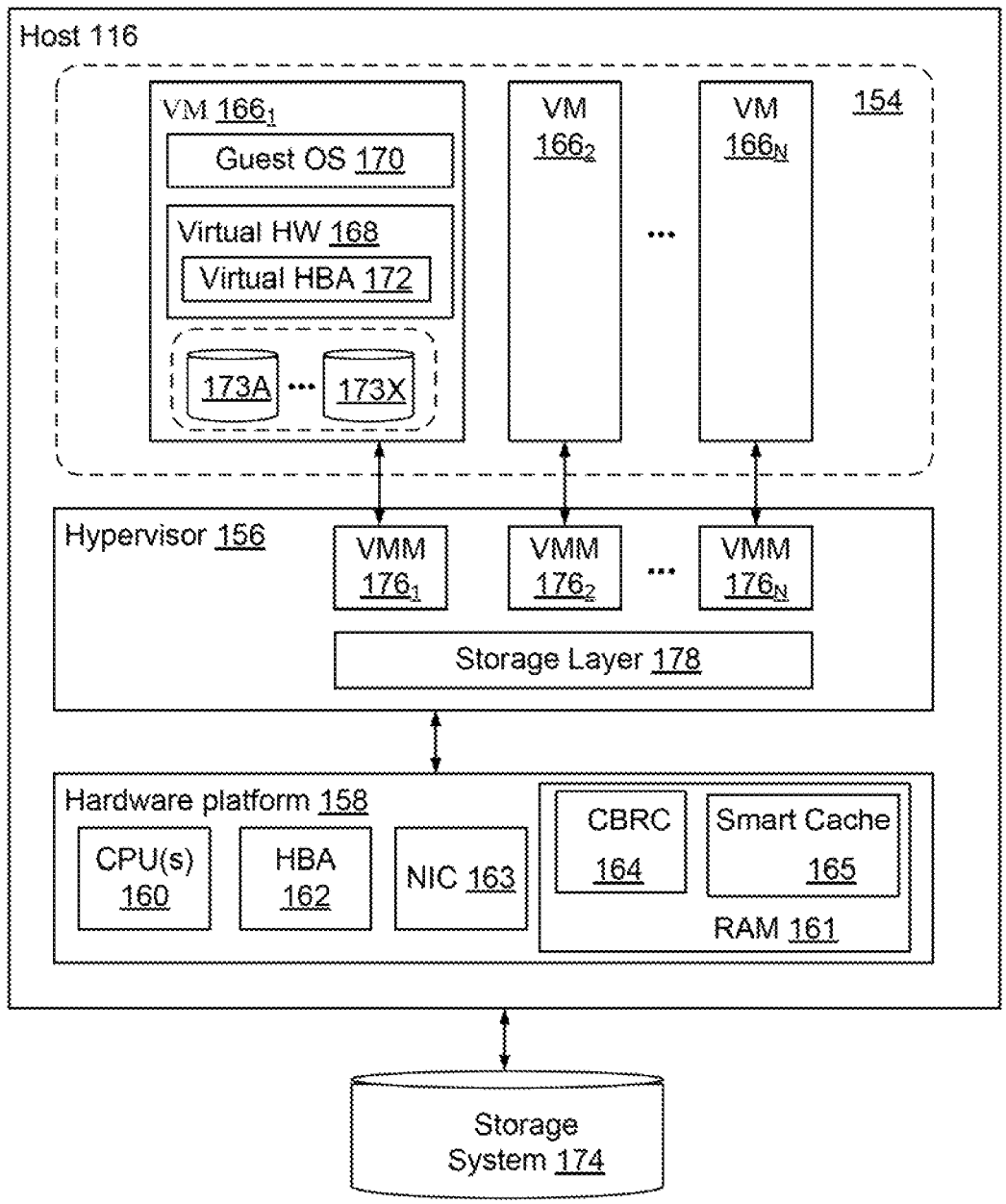
FIG. 1B illustrates additional components of a computing environment in which embodiments of the present disclosure may be implemented.

FIG. 1B illustrates additional components of a computing environment in which embodiments of the present disclosure may be implemented.

Host 116 generally represents hosts $116_{1-N}$ of FIG. 1A. The host 116 includes a set 154 of virtual machines (VMs) $166_{1-N}$, a software interface layer, referred to as a hypervisor 156, which enables sharing of a hardware platform 158 by VMs $166_{1-N}$. One example of hypervisor 156 is a VMware® ESXi hypervisor provided as part of the VMware® vSphere solution made commercially available from VMware®, Inc. In some embodiments, host 116 is coupled to a storage system 174, which is implemented as software-defined storage, such as VMware® Virtual SAN, which groups together server-attached hard disks and/or solid-state drives (HDDs and/or SSDs), to create a flash-optimized, highly resilient shared data store designed for virtual environments.

Host 116 generally comprises a general-purpose computer system having one or more virtual machines accessing data stored on a storage system 174 communicatively connected to host 116. In certain embodiments, the hardware platform 158 on which the host is constructed is a conventional, typically server-class, hardware platform 158. Hardware platform 158 of host 116 generally includes conventional physical components of a computing device, such as one or more processors (CPUs) 160, a RAM 161, a disk interface (host bus adapter (HBA)) 162, and a network interface card (NIC) 163. CPU 160 is configured to execute instructions, for example, executable instructions that perform one or more operations described herein and may be stored in random access memory (RAM) 161. RAM 161 and storage system 174 are devices allowing information, such as executable instructions, virtual disks, configurations, and other data, to be stored and retrieved. In certain embodiments, RAM 161 includes one or more memory modules. RAM 161 includes a CBRC 164 and smart cache 165, as further discussed herein.

Storage system 174 generally includes one or more locally attached storage devices, for example, one or more hard disks, flash memory modules, solid-state disks, and optical disks. In some embodiments, storage system 174 includes a shared storage system having one or more storage arrays of any type, such as network-attached storage (NAS) or a block-based device over a storage area network (SAN). Disk interface 162, such as a host bus adapter (HBA), enables host 116 to communicate with a storage device, such as storage system 174, to store virtual disks $173_{A-X}$ that are accessed by VMs $166_{1-N}$ via virtual disk interface (vHBA) 172. Network interface controller (NIC) 163 enables host 116 to communicate with another device via a communication medium, such as a communication network (e.g., network 108 of FIG. 1A).

While storage system 174 is typically made up of a plurality of disks, other forms of storage, such as solid-state non-volatile storage devices, may be used, and the use of the term, "disk" herein, should therefore not be construed as limited only to rotating disk storage media, but may also be construed to encompass solid-state disks, or "SSDs." In some embodiments, storage system 174 is comprised of high-density non-volatile memory. Furthermore, while storage system 174 is depicted as a separate, external component to host 116, storage system 174 may alternatively be internal to host 116, for example, a local storage device or locally attached storage.

As shown in FIG. 1B, a hypervisor 156 is installed on top of hardware platform 158 and supports multiple virtual machines (VMs) $166_1$-$166_N$. In certain embodiments, each such virtual machine VMs $166_1$-$166_N$ implements a virtual hardware platform 168 that supports the installation of a guest operating system (OS) 170, which is capable of executing one or more applications (not shown). Examples of a guest OS 170 include any of the well-known commodity operating systems, such as the Microsoft Windows® operating system, the Linux® operating system, and the like. Persistent storage space for VMS $166_{1-N}$ is managed by the storage layer 178 in hypervisor 156 via VMM layers $176_1$ to $176_N$. In some embodiments, hypervisor 156 runs on top of a host operating system of host 116, while in other embodiments, hypervisor 156 runs directly on hardware components, such as hardware platform 158 of host 116.

It should be recognized that the various terms, layers and categorizations used to describe the virtualization components in FIG. 1B may be referred to differently without departing from their functionality or the spirit or scope of the invention. For example, VMMs $176_{1-N}$ may be considered separate virtualization components between VMs $166_{1-N}$ and hypervisor 156 (which, in such a conception, may itself be considered a virtualization "kernel" component) since there exists a separate VMM for each instantiated VM. Alternatively, each VMM $176_{1-N}$ may be considered to be a component of its corresponding virtual machine since each such VMM $176_{1-N}$ includes the hardware emulation components for the virtual machine. In such an alternative conception, for example, the conceptual layer described as a virtual hardware platform is merged with and into VMM $176_{1-N}$ such that each virtual host bus adapter (virtual HBA) 172 is removed from FIG. 1B (i.e., since its functionality is effectuated by a host bus adapter emulator within VMM $176_{1-N}$).

Figure 1C:
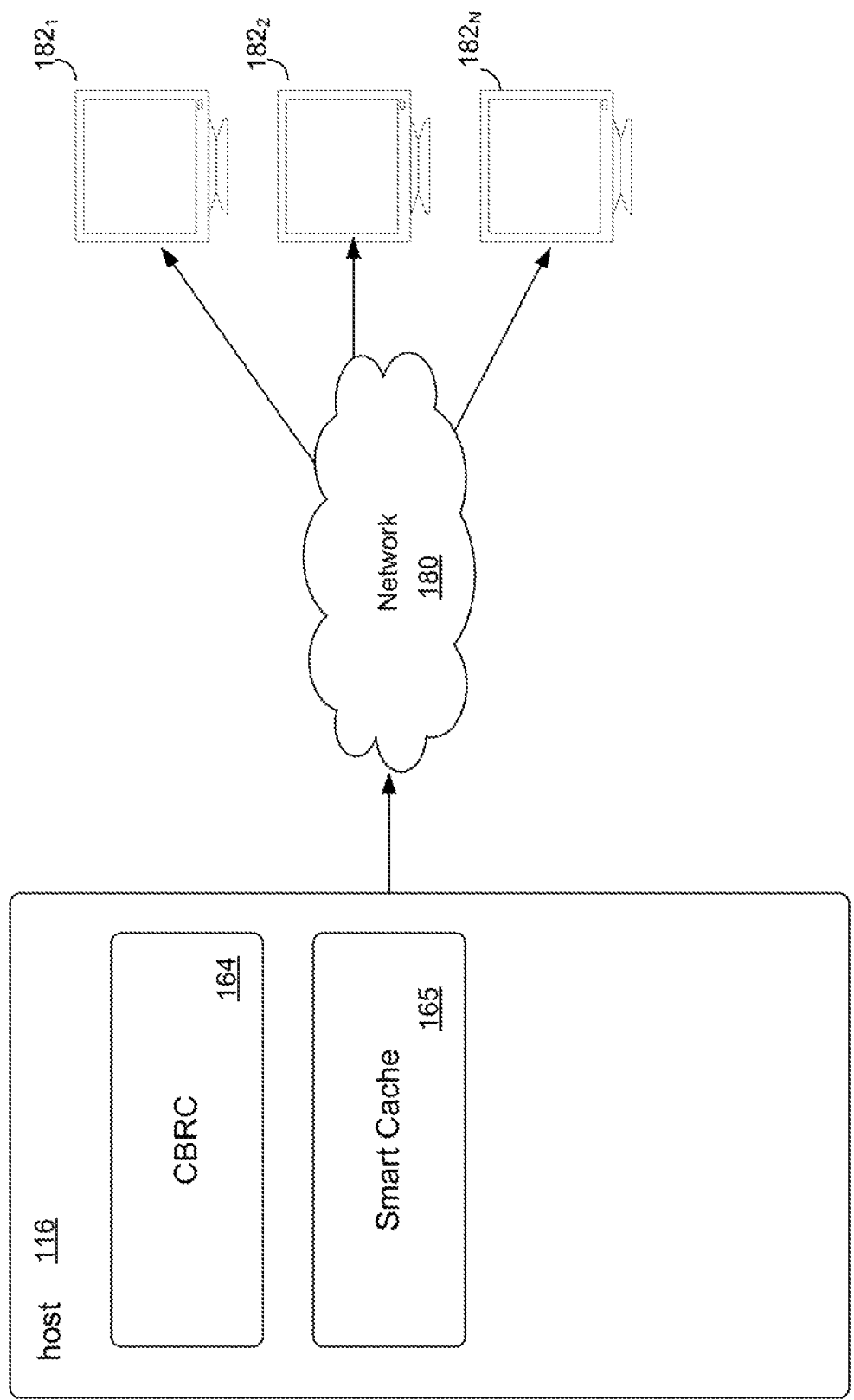
FIG. 1C depicts a simplified environment for a VDI, in an embodiment.

FIG. 1C depicts a simplified environment for a VDI, in an embodiment. As shown, one of the hosts $116_{1-N}$, say host $116_1$, supports multiple client devices $182_{1-N}$ using a content based read cache (CBRC) 164 and a smart cache 165. Each of the client devices $182_{1-N}$, such as a laptop computer or mobile device, runs a virtual desktop client that interacts with a virtual desktops $118_{1-N}$, such as those in FIG. 1A, via a network 180, which can be a local area network (LAN), a wide area network (WAN) or the Internet.

Figure 1D:
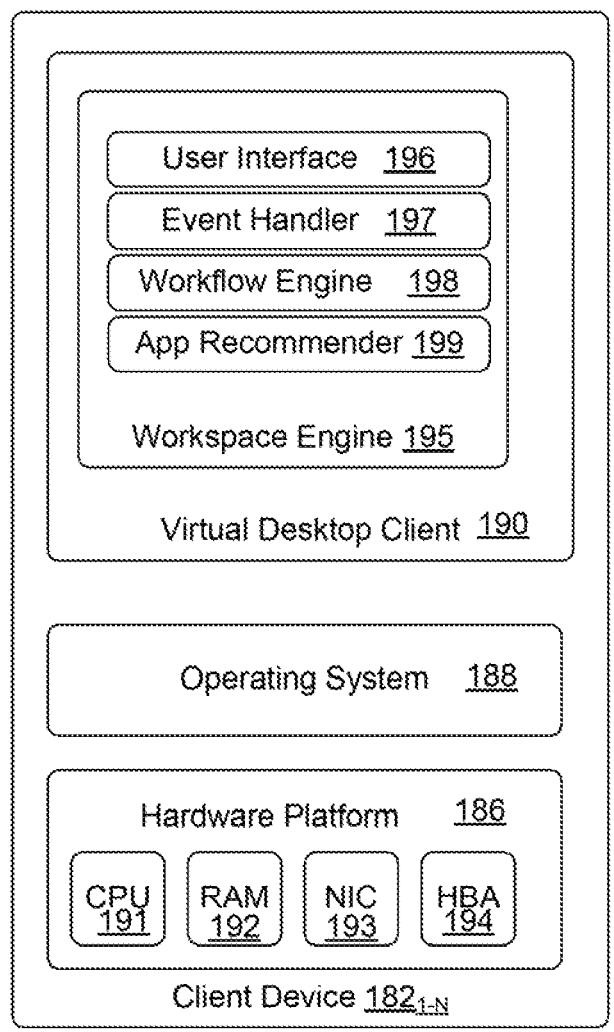
FIG. 1D depicts a virtual desktop client device, in an embodiment.

FIG. 1D depicts a virtual desktop client device, in an embodiment. Each virtual desktop client device $182_{1-N}$ includes an operating system 188, a hardware platform 186. Hardware platform 186 includes one or more CPUs 191, a RAM 192, a network interface controller (NIC) 193, and a host bus adapter (HBA) 194. Each virtual desktop client device $152_{1-N}$ runs virtual desktop client software 190, which in turn includes a workspace engine 195. The workspace engine 195 includes a set of or services, such as a user interface 196, an event handler 197, a workflow engine 198, and an application recommender 199. By opening the user interface 196 of the workspace engine 195, the user of the client device $182_{1-N}$ connects to and accesses one of the virtual desktops $118_{1-N}$. Image frames of one of the virtual desktops $118_{1-N}$ are transmitted to associated one of the client devices $182_{1-N}$ by the image manager 130 at a certain frame rate in formats such as bitmap, raster graphic image, or vector graphics image. In certain embodiments, image frames are transmitted using a desktop delivery protocol such as VMware® Blast™, or Microsoft® Remote Desktop Protocol (RDP)™. In some embodiments, workflow engine 198 allows the user of the client device $182_{1-N}$ to specify a protocol for use in delivering the virtual desktop for display within user interface 196.

After transmission, the image frames are displayed on the client device $182_{1-N}$ for interaction by the user within user interface 196. The client device $182_{1-N}$ sends user inputs to the associated one of the virtual desktops $118_{1-N}$ for processing, thereby taking processing load off of the client device $182_{1-N}$. For example, graphically selecting an item, say with a mouse, on the user interface 196 is captured by the event handler 197 in the workspace engine 195, which sends a message to the associated one of the virtual desktops $118_{1-N}$ connected to the client device $182_{1-N}$ regarding the selection. The event handler 197 also supports drag and drop operations on the user interface 196. The workflow engine 198 is a facility of the workspace engine 195 that supports designing, managing, and executing workflows based on a workflow template. The application recommender 199 is a facility that associates applications with resources, such as files that are displayed as icons on the user interface 196.

Such centralized and automated management of virtualized desktops provides increased control and cost savings. In certain embodiments, the client device runs VMware® View™, or a special purpose thin client such as those available from Dell, HP, NEC, Sun Microsystems, Wyse, and others, within user interface 196.

Figure 2A:
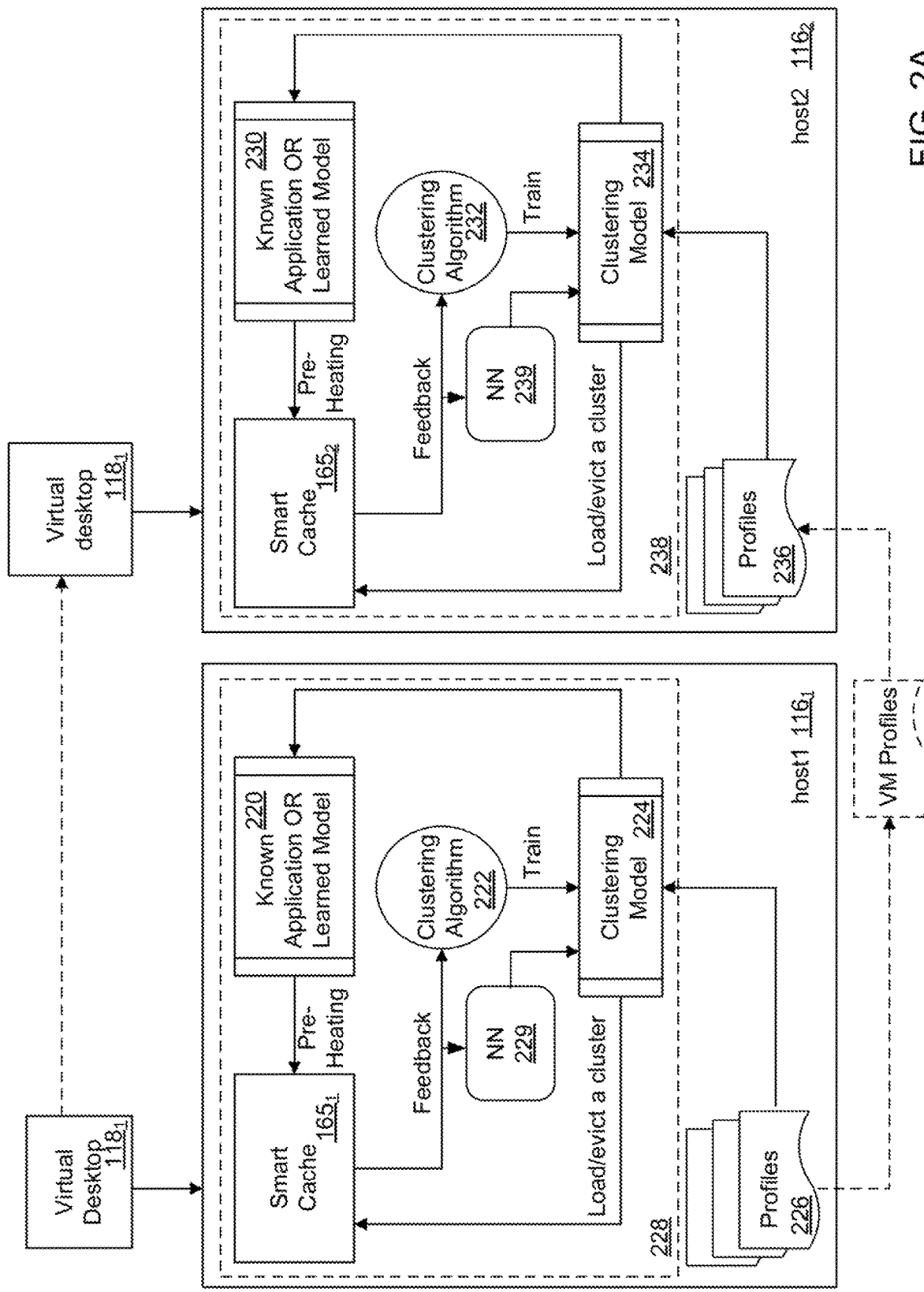
FIG. 2A depicts a block diagram of the smart cache system, in an embodiment.

FIG. 2A depicts a block diagram of the smart cache system, in an embodiment. As shown, there are two hosts $116_1$ and $116_2$ and a virtual desktop $118_1$, which is a virtual computing instance such as virtual machine $116_1$. Host1 $116_1$ includes smart cache system 228 and a set of profiles 226. Smart cache system 228 includes a smart cache $165_1$, which is coupled to a known_application_or_learned_model 220, a neural net 229, a clustering algorithm 222, and a clustering model 224. The set of VM profiles 226 is coupled to the clustering model 224. In some embodiments, smart cache system 228 resides in a hypervisor of the host, such as hypervisor 156 in host 116 of FIG. 1B.

Still referring to FIG. 2A, host2 $116_2$ includes smart cache system 238, residing in a hypervisor of host $116_2$, and a set of profiles 236. Smart cache system 238 includes smart cache $165_2$, which is coupled to known_application_or_learned_model 230, a neural net 239, a clustering algorithm 232, and a clustering model 234. The set of VM profiles 236 is coupled to the clustering model 234.

The clustering model 224, 226 stores clusters of data blocks. I/O requests are formed into clusters based on properties of the I/O requests. Each cluster further is associated with persistent metadata (described below) containing the properties of the I/O requests. In the set of VM profiles 226, 236, each profile stores a set of previously used clustering models 224 relating to the virtual desktop using the smart cache $165_{1-2}$. Known_application_or_learned_model 220, 230 contains a previously learned set of clusters or alternatively blocks of a known application specified by an administrator, for pre-heating smart cache $165_1$, $165_2$, respectively. Model 220, 230 is further described in reference to FIG. 5.

Figure 2B:
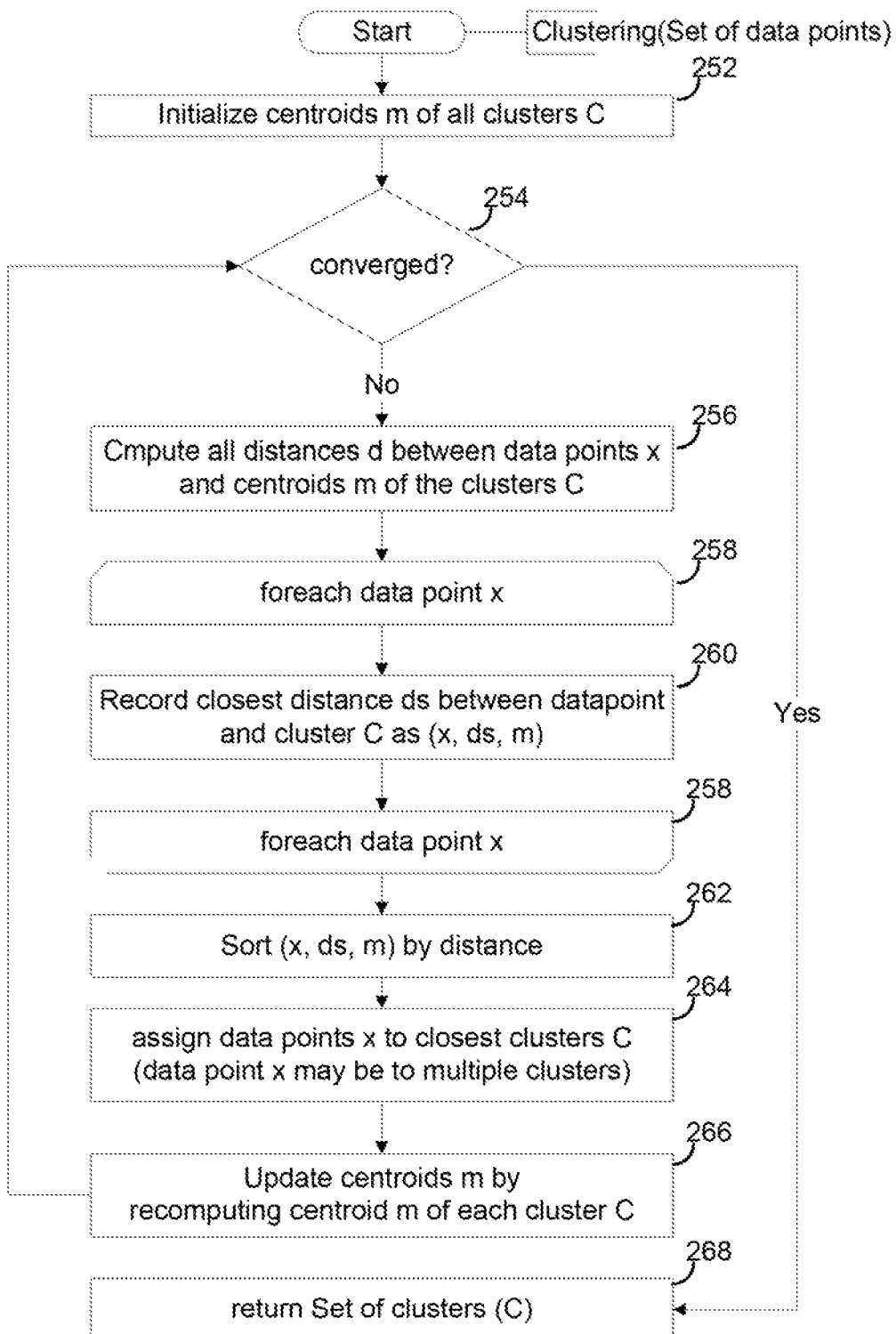
FIG. 2B depicts a flow of operations for forming clusters.

FIG. 2B depicts a flow of operation for forming clusters. The clustering algorithm is called with a number of data points x.

In step 252, the centroid m of each cluster C initialized. In step 254, the function tests whether the algorithm has converged, where convergence is based on an objective function for the algorithm. In step 256, the function computes the distances d (e.g., a Euclidean distance, but other distance formulas can be used) between every data point x (of which there are n) and the centroids m of clusters (of which there are k). In step 258, an iterator runs over all of the data points x and records its closest cluster C and that distance d as (x, ds, m). In step 260, the function sorts (x, ds, m) by distance. In step 262, the function assigns data points x to the closest clusters C. Assignments can allow data points to reside in more than one cluster. In step 264, the function updates the centroids m after the assignments. Following step 264, the function tests in step 254 the objective function for convergence. If there is convergence, then the function returns in step 268 with a set of clusters. In one embodiment, a NEO-K-means is used to determine the clusters of similar I/O requests.

In the clustering process, each of the data points x and each centroid is a tuple that includes the metadata of the I/O request, which includes four properties of the I/O. These properties are (1) a time, (2) a disk offset, (3) a size, and (4) a unique id, where the time is a timestamp of the I/O request, the disk offset is the offset location in the file for the requested block, the size is the size of the I/O request in blocks, and the unique id is an identifier of the process (e.g., hypervisor process for the virtual machine running the virtual desktop) that made the request. The metadata also includes a list of the data blocks that were a part of the I/Os. For example, the blocks may be identified in the list by their unique logical block addresses. The I/Os that were involved in forming this cluster are also saved but are used only when re-computing clusters during which blocks for the I/Os that are no longer part of the cluster are removed.

Thus, the size of the cluster and its contents are not pre-determined but are instead learned for a sequence of I/O requests over a time period of the workload of the virtual desktop application. The cluster size is restricted by parameters that include the size of the smart cache 165 available and a hit ratio of the cache, where the hit ratio is the ratio of hits to the cache and the total number of lookups. In certain embodiments, cluster sizes can range from tens of blocks to hundreds of blocks.

A reward-based learning attempts to maintain the cache hit rate above a threshold by changing the cluster size. In one version, reward-based learning trains an artificial neural network (NN) 229, 239, with a training set that includes pairs ($x^k$, $r^k$), wherein $x^k$ is the input vector and $r^k$ is an evaluative signal that indicates the appropriateness of the unit's output due to the input $x^k$. For example, the input vector $x^k$ can include one or more of the cache size, the cache hit rate, the current cluster size, the amount of thrashing happening in the host, and the number of evictions.

A virtual desktop $118_1$ is supported by host $116_1$, but can migrate to a destination host $116_2$. If and when virtual desktop $118_1$ is migrated, some or all of profiles 226 are migrated as well to become profiles 236, where the profiles contain persistently stored clustering models each with a tag that associates a particular virtual desktop with a clustering model and the clustering model contains a set of clusters that have been learned during operation of the virtual desktop $118_1$. Tags may be used for several purposes including one or more of: identifying a pre-trained model which is used when the virtual desktop first starts using the smart cache; identifying a model for pre-heating the smart cache when a new virtual desktop is created so that the smart cache has an initial context; and identifying a model for moving to a destination host so that the destination host does not need to relearn a suitable clustering model.

Figure 3:
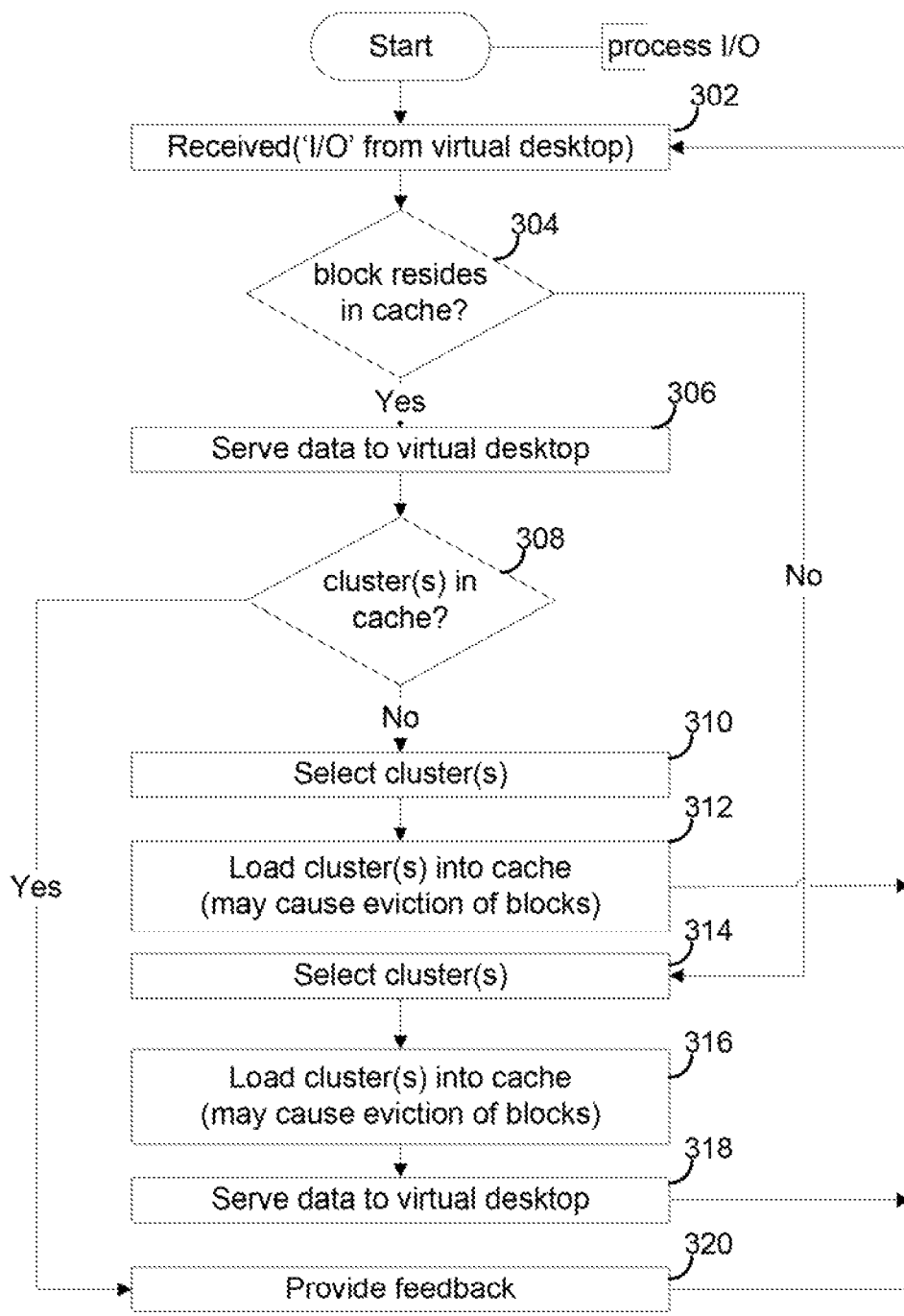
FIG. 3 depicts a flow of operations for processing an I/O request received from a virtual desktop, in an embodiment.

FIG. 3 depicts a flow of operations for processing an I/O request received from a virtual desktop, in an embodiment.

In step 302, smart cache system 228 receives an I/O request for one or more data blocks specified in the I/O request from virtual desktop $118_1$. For example, the I/O request is received by hypervisor 156 trapping the request and processing it in the storage layer 178. In step 304, smart cache system 228 determines whether the requested data block resides in smart cache $165_1$. If the requested data block does reside in smart cache $165_1$, then in step 306, smart cache $165_1$ supplies the data of the requested block to the virtual desktop $118_1$. In step 308, the cache system 228 determines whether a cluster containing the requested block resides in smart cache $165_1$. If not, then in step 310, smart cache system 228 selects one or more clusters, and in step 312 loads the one or more clusters into smart cache $165_1$. Smart cache system 228 selects the one or more clusters by determining which clusters are similar to the received I/O request, where the similarity may be based on the distance formula described in the clustering algorithm above to one or more centroids, or other suitable methods. In addition, in step 312, loading one or more blocks into smart cache $165_1$ may involve evicting one or more blocks out of smart cache $165_1$ to make room for the one or more clusters. The selection of blocks for eviction depends on the recency of use of the blocks, such as recency determined by a least recently used (LRU) algorithm. If a block selected for eviction is associated with a large number of other clusters, then the block may be kept in the cache.

Still referring to FIG. 3, if, as determined in step 304, the requested block is not in smart cache $165_1$, then in step 314, smart cache system 228 selects one or more clusters (again based on the similarity of properties of the received I/O and properties of the cluster centroids, or other suitable methods) and in step 316 loads the one or more clusters into smart cache $165_1$. In step 318, smart cache system 228 serves the requested data to requesting virtual desktop $118_1$.

If, as determined in step 308, the one or more clusters are loaded in the cache, then the clustering algorithm is called with feedback in step 320, where the feedback indicates that the one or more clusters were present in smart cache $165_1$. This feedback provides input to the reward-based learning system and the clustering algorithm described in reference to FIG. 4.

Figure 4:
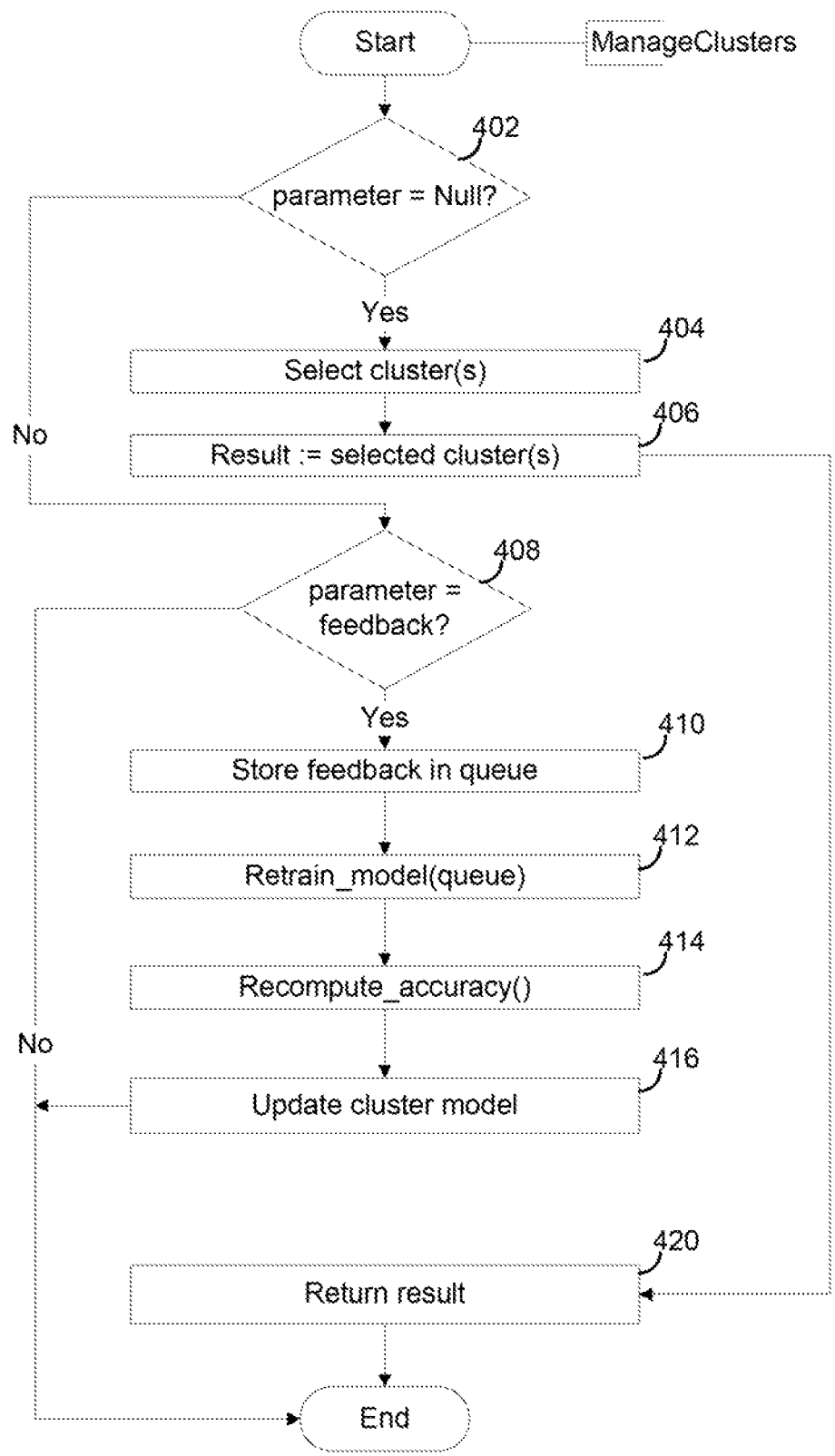
FIG. 4 depicts a flow of operations for managing the clustering, in an embodiment.

FIG. 4 depicts a flow of operations for managing the clustering, in an embodiment. In step 402, manager 222 looks for whether a parameter is passed. If no parameter is passed (parameter=Null), then in step 404, the manager selects one or more clusters in step 405 and returns the cluster or clusters as the value of 'result' in step 420.

If a parameter is passed (parameter=feedback) as determined in step 408, where the feedback is an indicator that a set of blocks of a cluster containing a requested block was found in the smart cache $165_1$. In step 410, the clustering algorithm 222 stores the feedback in a queue and, in step 412, retrains clustering model 224 based on data in the queue. Retraining the clustering model involves performing the steps described in FIG. 2B. During the retraining of the clustering model, all of the I/Os belonging to a cluster are pulled out, combined with the new I/Os in the feedback queue, and the centroids are recalculated. During the retraining, because the size of the cluster is fixed by the reward-based learning system, some I/Os may be left out. These I/Os may not get clustered with other clusters and are accordingly cleaned out.

Still referring to FIG. 4, in step 414, the manager 222 re-computes the prediction accuracy of the clustering model 224, where prediction accuracy is based on calculating a distance matrix, which contains, for each cluster, the average distance of all points in the cluster and is improved by minimizing that average distance. In step 416, the manager 222 updates the clustering model 224 with an improved set of clusters based on the feedback.

Figure 5:
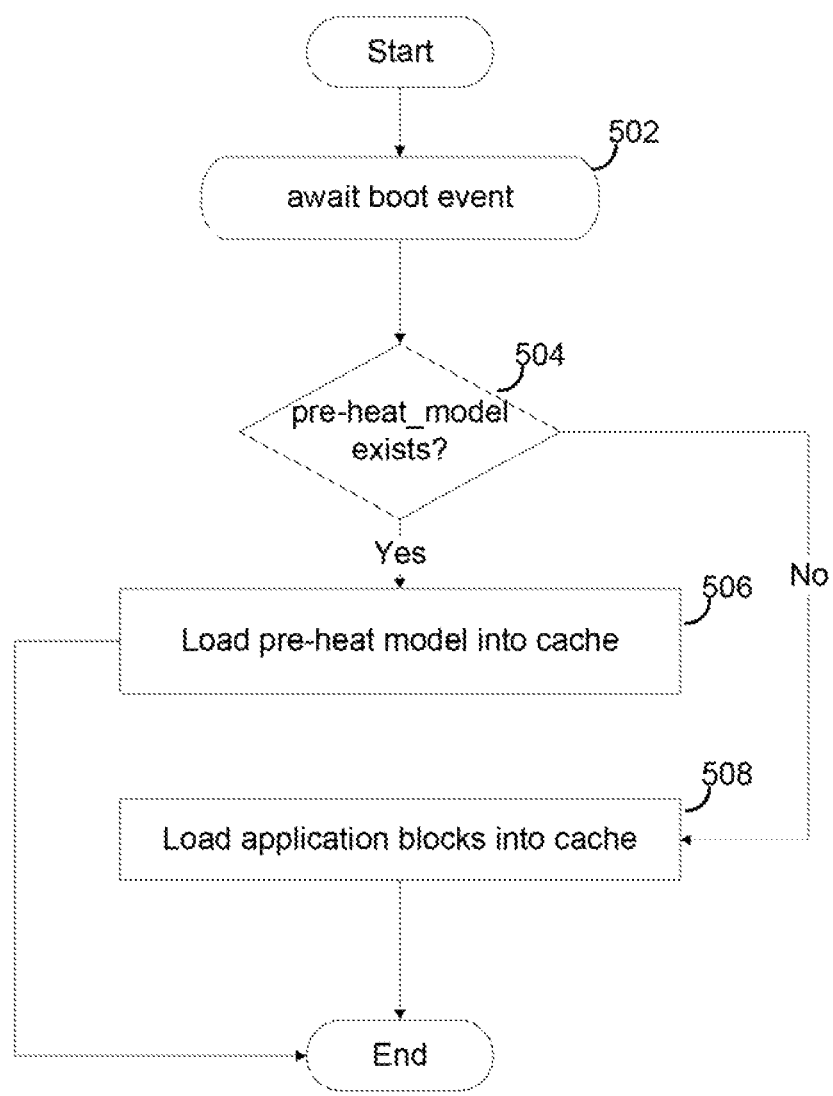
FIG. 5 depicts a flow of operations of a function that handles a boot event, in an embodiment.

FIG. 5 depicts a flow of operations of a function that handles a boot event, in an embodiment. In step 502, the function awaits the boot event. In step 504, upon receiving the boot event, the function determines whether a pre-heat model exists in the known_application_learned_model 220. If so, then, in step 506, the function loads the pre-heat model into smart cache $165_1$. It is highly likely that the pre-heat model, which is the one that is trained based on I/Os occurring immediately after the boot event, will be used when the virtual computing instance (e.g., virtual desktop) is powered back on again.

If no pre-heat model exists, then in step 508, the function loads into smart cache $165_1$ blocks relating to applications, that are manually marked by an administrator as likely to be executed by the virtual desktops and stored in known_application_learned_model 220.

Figure 6:
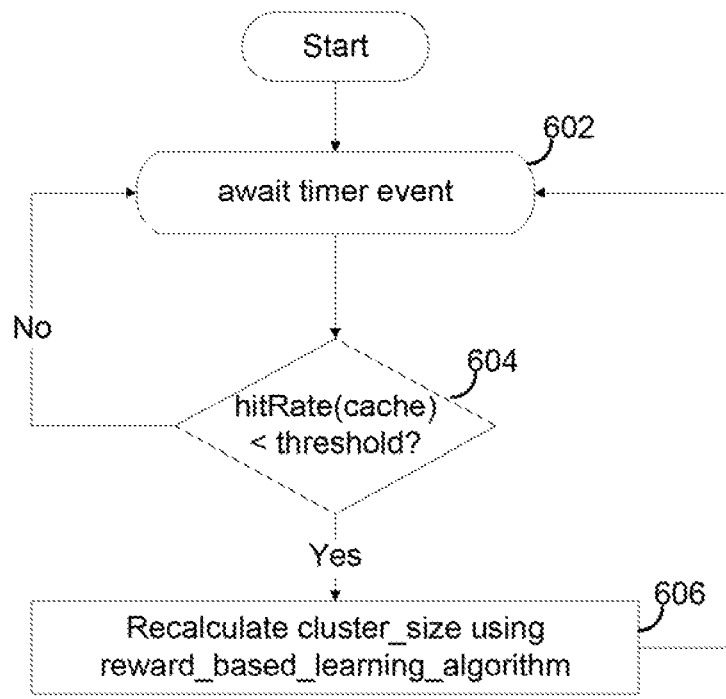
FIG. 6 depicts a flow of operations of a function that handles a timer event, in an embodiment.

FIG. 6 depicts a flow of operations of a function that handles a timer event, in an embodiment. In step 602, the function awaits the timer event. In step 604, upon receiving the timer event, the function determines whether a hit rate of smart cache $165_1$ is less than a given threshold, where the hit rate is based on the feedback that indicates whether requested blocks were present in smart cache $165_1$. If so, then in step 606, the function recalculates the cluster size using the reward-based learning NN 229, 239 described above.

Thus, a clustering algorithm and reward-based learning dynamically cooperate to provide a cache with sets of blocks that are highly likely to be used by a specific workload while a workload, such as the virtual desktop, is running.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer-readable media. The term computer-readable medium refers to any data storage device that can store data which can thereafter be input to a computer system—computer-readable media may be based on any existing or subsequently developed technology for embodying computer programs in a manner that enables them to be read by a computer. Examples of a computer-readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer-readable medium can also be distributed over a network coupled computer system so that the computer-readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various, virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system level virtualization, wherein an abstraction layer is provided on top of the kernel of an operating system on a host computer. The abstraction layer supports multiple OS-less containers, each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configuration. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for dynamically managing content of a cache, the method comprising:
   receiving I/O requests from one or more virtual computing instances, wherein each I/O request specifies one or more blocks of data;
   clustering the received I/O requests into a plurality of clusters by a machine-learning clustering algorithm that collects the I/O requests received from the one or more virtual computing instances into clusters of similar I/O requests based on properties of the received I/O requests;
   receiving a first I/O request from a first virtual computing instance;
   identifying, by the machine-learning clustering algorithm, a first cluster of the plurality of clusters as having similar I/O requests as the first I/O request based on properties of the first I/O request; and
   loading a set of blocks comprising at least one of the one or more blocks specified by at least one of the I/O requests of the first cluster into the cache.

2. The method of claim 1, wherein clustering the received I/O requests into the plurality of clusters comprises sizing each of the plurality of clusters based on a size of the cache and a cache hit ratio.

3. The method of claim 1, wherein the properties of each I/O request of the received I/O requests include one or more of a time at which the I/O request was received, a size of the received I/O request, a disk offset value of the received I/O request, or a unique identifier of a given virtual computing instance that made the received I/O request.

4. The method of claim 1, further comprising, prior to initial boot of the first virtual computing instance:
   receiving an indication of one or more applications loaded in the first virtual computing instance;
   identifying, by the machine-learning clustering algorithm, a cluster of the plurality of clusters having I/O requests associated with the one or more applications based on the properties of the received I/O requests; and
   loading blocks specified by the I/O requests of the cluster into the cache.

5. The method of claim 1, further comprising, prior to a boot of the first virtual computing instance:
   identifying, by the machine-learning clustering algorithm, a cluster of the plurality of clusters having I/O requests associated with the first virtual computing instance based on the properties of the received I/O requests; and
   loading blocks specified by the I/O requests of the cluster into the cache.

6. The method of claim 1, wherein loading the set of blocks comprises:
   selecting one or more blocks in the cache for eviction based on a number of the plurality of clusters including at least one I/O request specifying the one or more blocks; and
   evicting from the cache the selected one or more blocks.

7. The method of claim 1, further comprising:
   determining if a hit rate of the cache is less than a threshold; and
   when the hit rate is less than the threshold, adjusting sizes of the plurality of clusters.

8. A system for dynamically managing content of a cache, the system comprising:
   a main memory; and
   one or more CPUs coupled to the main memory;
   wherein the main memory contains virtualization software for running a virtual computing instance and includes a cache;
   wherein the one or more CPUs run the virtualization software and the virtual computing instance which contains one or more virtual desktop applications; and
   wherein the one or more CPUs running the virtualization software are configured to cause the system to:
      receive I/O requests from one or more virtual computing instances, wherein each I/O request specifies one or more blocks of data;
      cluster the received I/O requests into a plurality of clusters by a machine-learning clustering algorithm that collects the I/O requests received from the one or more virtual computing instances into clusters of similar I/O requests based on properties of the received I/O requests;

receive a first I/O request from a first virtual computing instance;

identify, by the machine-learning clustering algorithm, a first cluster of the plurality of clusters as having similar I/O requests as the first I/O request based on properties of the first I/O request; and load a set of blocks comprising at least one of the one or more blocks specified by at least one of the I/O requests of the first cluster into the cache.

9. The system of claim 8, wherein to cause the system to cluster the received I/O requests into the plurality of clusters comprises to cause the system to size each of the plurality of clusters based on a size of the cache and a cache hit ratio.

10. The system of claim 8, wherein the properties of each I/O request of the received I/O requests include one or more of a time at which the I/O request was received, a size of the received I/O request, a disk offset value of the received I/O request, or a unique identifier of a given virtual computing instance that made the received I/O request.

11. The system of claim 8, wherein the one or more CPUs running the virtualization software are further configured to cause the system to, prior to initial boot of the first virtual computing instance:

receive an indication of one or more applications loaded in the first virtual computing instance;

identify, by the machine-learning clustering algorithm, a cluster of the plurality of clusters having I/O requests associated with the one or more applications based on the properties of the received I/O requests; and load blocks specified by the I/O requests of the cluster into the cache.

12. The system of claim 8, wherein the one or more CPUs running the virtualization software are further configured to cause the system to, prior to a boot of the first virtual computing instance:

identify, by the machine-learning clustering algorithm, a cluster of the plurality of clusters having I/O requests associated with the first virtual computing instance based on the properties of the received I/O requests; and load blocks specified by the I/O requests of the cluster into the cache.

13. The system of claim 8, wherein to cause the system to load the set of blocks includes to cause the system to:

select one or more blocks in the cache for eviction based on a number of the plurality of clusters including at least one I/O request specifying the one or more blocks; and evict from the cache the selected one or more blocks.

14. The system of claim 8, wherein the one or more CPUs running the virtualization software are further configured to cause the system to:

determine if a hit rate of the cache is less than a threshold; and when the hit rate is less than the threshold, adjust sizes of the plurality of clusters.

15. A non-transitory computer-readable medium containing instructions executable in a computer system, wherein the instructions, when executed in the computer system, cause the computer system to carry out a method for dynamically managing content of a cache, the method comprising:

receiving I/O requests from one or more virtual computing instances, wherein each I/O request specifies one or more blocks of data;

clustering the received I/O requests into a plurality of clusters by a machine-learning clustering algorithm that collects the I/O requests received from the one or more virtual computing instances into clusters of similar I/O requests based on properties of the received I/O requests;

receiving a first I/O request from a first virtual computing instance;

identifying, by the machine-learning clustering algorithm, a first cluster of the plurality of clusters as having similar I/O requests as the first I/O request based on properties of the first I/O request; and loading a set of blocks comprising at least one of the one or more blocks specified by at least one of the I/O requests of the first cluster into the cache.

16. The non-transitory computer-readable medium of claim 15, wherein clustering the received I/O requests into the plurality of clusters comprises sizing each of the plurality of clusters based on a size of the cache and a cache hit ratio.

17. The non-transitory computer-readable medium of claim 15, wherein the properties each I/O request of the received I/O requests include one or more of a time at which the I/O request was received, a size of the received I/O request, a disk offset value of the received I/O request, or a unique identifier of a given virtual computing instance that made the received I/O request.

18. The non-transitory computer-readable medium of claim 15, the method further comprising, prior to initial boot of the first virtual computing instance:

receiving an indication of one or more applications loaded in the first virtual computing instance;

identifying, by the machine-learning clustering algorithm, a cluster of the plurality of clusters having I/O requests associated with the one or more applications based on the properties of the received I/O requests; and loading blocks specified by the I/O requests of the cluster into the cache.

19. The non-transitory computer-readable medium of claim 15, the method further comprising, prior to a boot of the first virtual computing instance:

identifying, by the machine-learning clustering algorithm, a cluster of the plurality of clusters having I/O requests associated with the first virtual computing instance based on the properties of the received I/O requests; and loading blocks specified by the I/O requests of the cluster into the cache.

20. The non-transitory computer-readable medium of claim 15, wherein loading the set of blocks comprises:

selecting one or more blocks in the cache for eviction based on a number of the plurality of clusters including at least one I/O request specifying the one or more blocks; and evicting from the cache the selected one or more blocks.

* * * * *